B. T. WEEKS.
COLLAPSIBLE STOCK CRATE.
APPLICATION FILED MAY 20, 1920.

1,369,068.

Patented Feb. 22, 1921.
2 SHEETS—SHEET 1.

Witness

Inventor
BENJAMIN T. WEEKS
Attorneys

B. T. WEEKS.
COLLAPSIBLE STOCK CRATE.
APPLICATION FILED MAY 20, 1920.
1,369,068.
Patented Feb. 22, 1921.
2 SHEETS—SHEET 2.
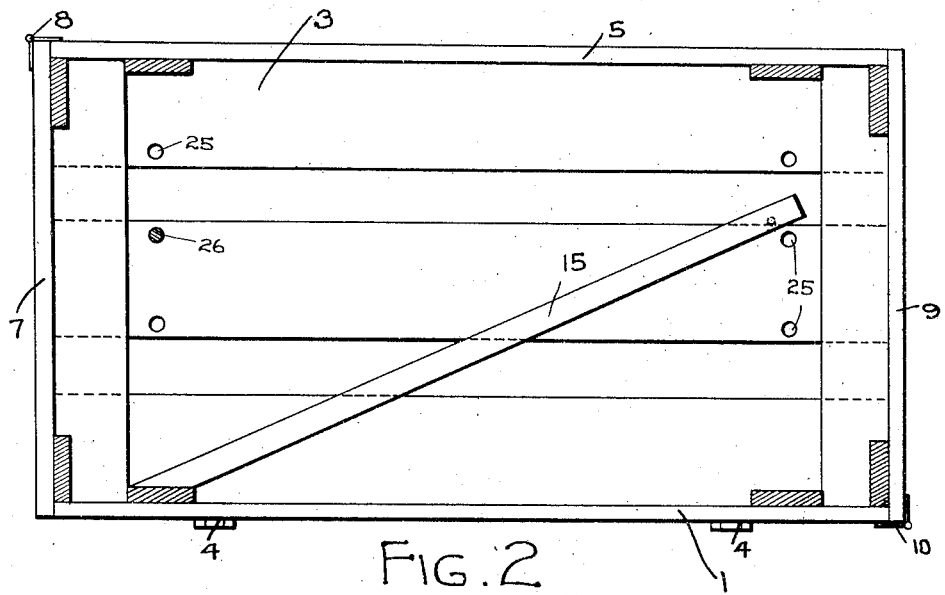
Fig. 2
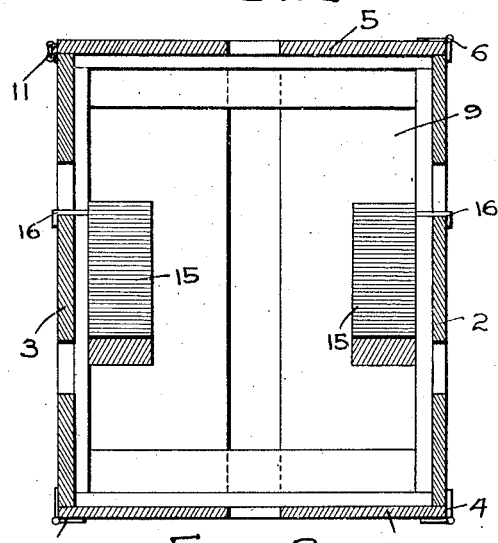
Fig. 3
Inventor
BENJAMIN T. WEEKS
Witness
By 
Attorneys

UNITED STATES PATENT OFFICE.

BENJIMAN THEOFLIS WEEKS, OF WHEELER, MISSISSIPPI.

COLLAPSIBLE STOCK-CRATE.

1,369,068.  Specification of Letters Patent.  Patented Feb. 22, 1921.

Application filed May 20, 1920. Serial No. 382,846.

*To all whom it may concern:*

Be it known that I, BENJIMAN T. WEEKS, a citizen of the United States, residing at Wheeler, in the county of Prentiss and State of Mississippi, have invented a new and useful Collapsible Stock-Crate, of which the following is a specification.

It is the object of this invention to provide a collapsible crate which may be used either for shipping stock or for breeding purposes.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
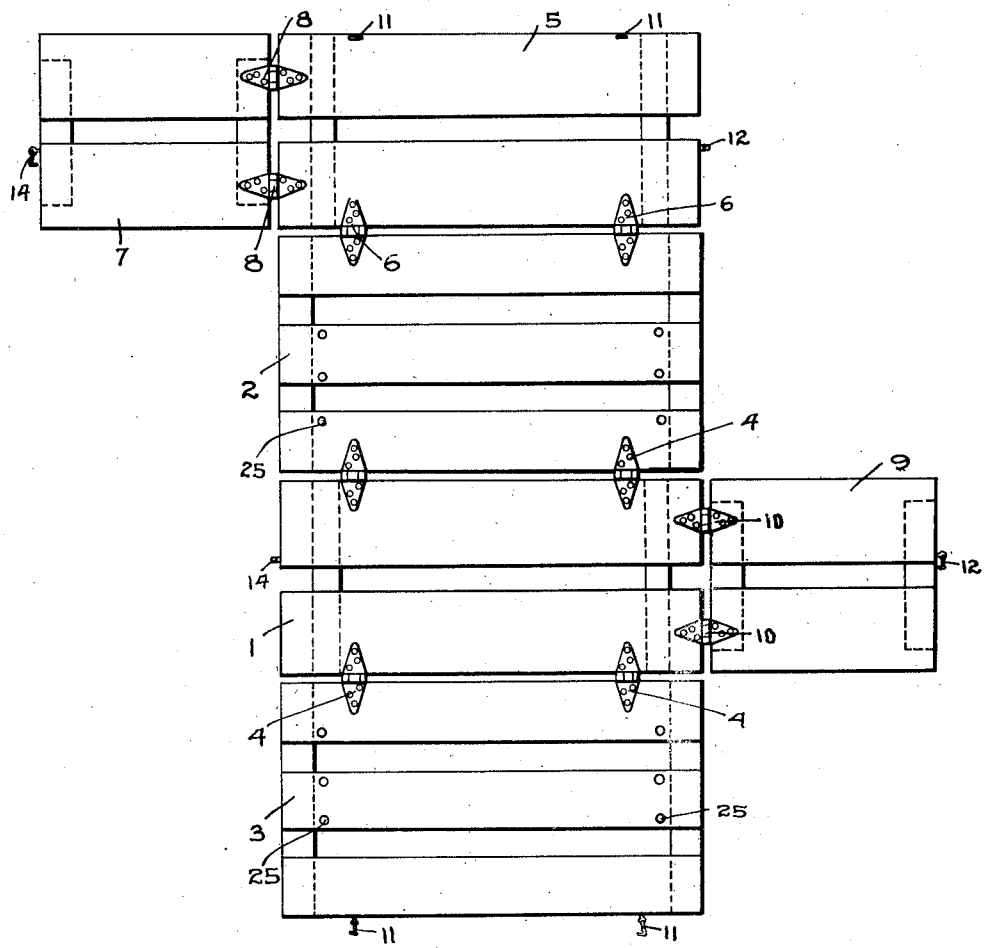
Figure 4:
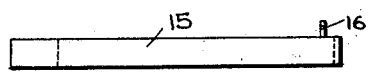

Figure 1 shows in plan, a crate constructed in accordance with the invention, the crate being unfolded and laid flat; Fig. 2 is a longitudinal section of the crate, the same having been set up; Fig. 3 is a transverse section of the crate set up; and Fig. 4 is a plan showing one of the supports employed when the crate is used for breeding purposes.

The crate forming the subject matter of this application includes a bottom 1 and sides 2 and 3 connected to the bottom by hinges 4, a top 5 being connected to the sides 2 by hinges 6. An end 7 is connected by hinges 8 to the top 5, an end 9 being connected by hinges 10 to the bottom 1. The top 5 and the side 3 may be united detachably by a hook and eye connection 11, a hook and eye connection 12 uniting the end 9 with the top 5, and a hook and eye connection 14 uniting the end 7 to the bottom 1. Additional connections between the parts may be employed wherever necessary or expedient.

The invention comprises a pair of supports 15, preferably in the form of planks. The supports 15 are spaced apart, as shown in Fig. 3 and are disposed closely adjacent to the sides 2 and 3, the supports slanting downwardly and rearwardly toward the end member or door 7, the lower ends of the supports 15 resting on the bottom 1, as shown best in Fig. 2. The upper ends of the supports 15 are supplied with outwardly extended hangers 16, preferably in the form of hooks. The sides 2 and 3 of the crate, and other parts of the crate, if desired, are made up of slats, the hangers 16 being engaged with certain of the slats of the sides 2 and 3, as shown in Fig. 3.

The supports 15 may be removed when desired, and they constitute a means whereby a breeding of animals, particularly swine, may be facilitated, the device being not only a shipping crate, but a breeding crate, as well.

Obviously, when desired, the crate may be collapsed and folded up into small compass for shipping.

The sides 2 and 3 are provided with holes 25 through which a rod 26 may be thrust. The rod 26 keeps the sow from backing out while she is being bred. The rod may be adjusted vertically, depending on the height of the sow. Since there are openings 25 at each end of the crate, the rod 26 may be placed at either end of the crate, the supports 15 being reversed and inclined accordingly.

Having thus described the invention, what is claimed is:—

A crate of the class described, comprising, a bottom, sides and end walls; supports disposed adjacent to the sides and spaced apart transversely, the supports slanting downwardly and rearwardly, the lower ends of the supports resting on the bottom; and means on the upper ends of the supports for engaging the sides detachably whereby each support may be turned end for end, to dispose its lower extremity adjacent to either end wall of the crate, both end walls of the crate being hingedly mounted to give access to the lower extremities of the supports.

In testimony that I claim the foregoing as my own, I have hereto affixed my signature in the presence of two witnesses.

BENJIMAN THEOFLIS WEEKS.

Witnesses:
 JOHN B. SANDERS,
 S. V. CROWE.